March 5, 1940.    A. L. VINCZE    2,192,762
CUTTING DISK FOR POWER MOWERS
Filed June 22, 1938    2 Sheets-Sheet 1
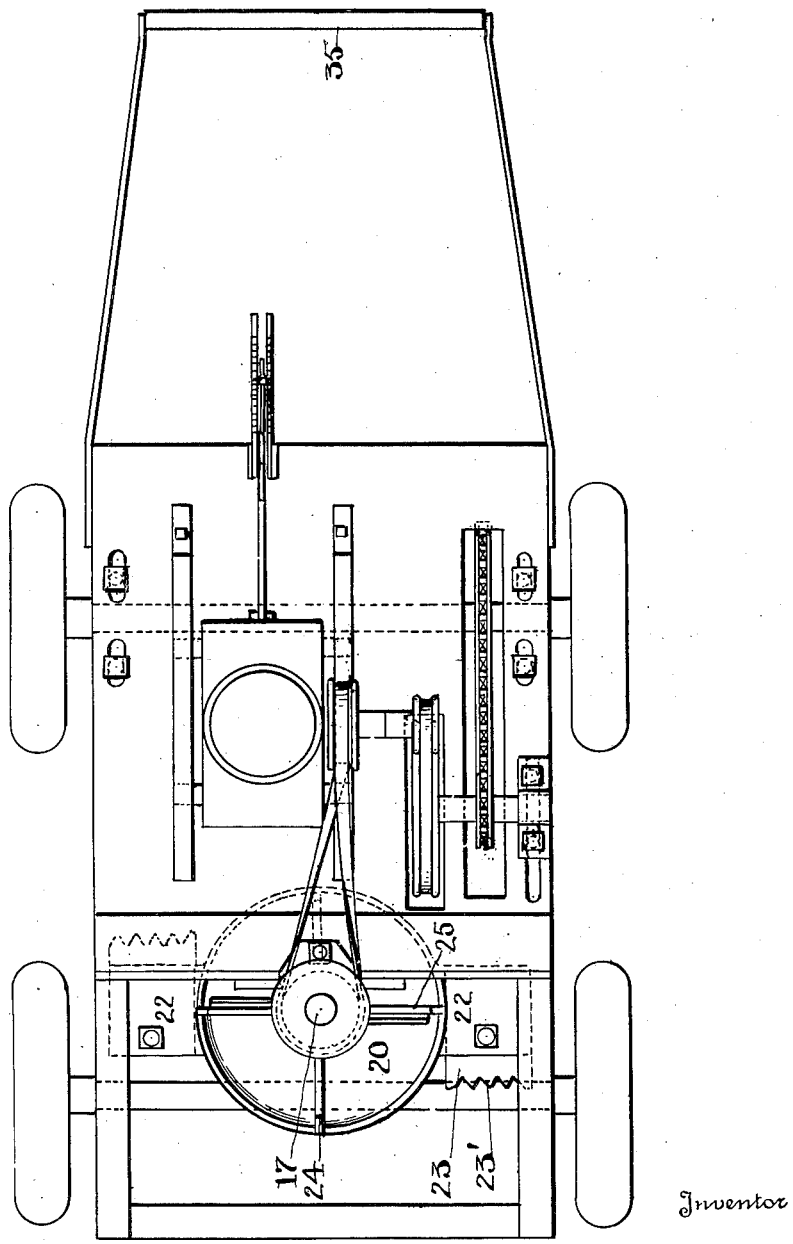
Inventor
ALEXANDER L. VINCZE
By Edward M. Fisher
Attorney

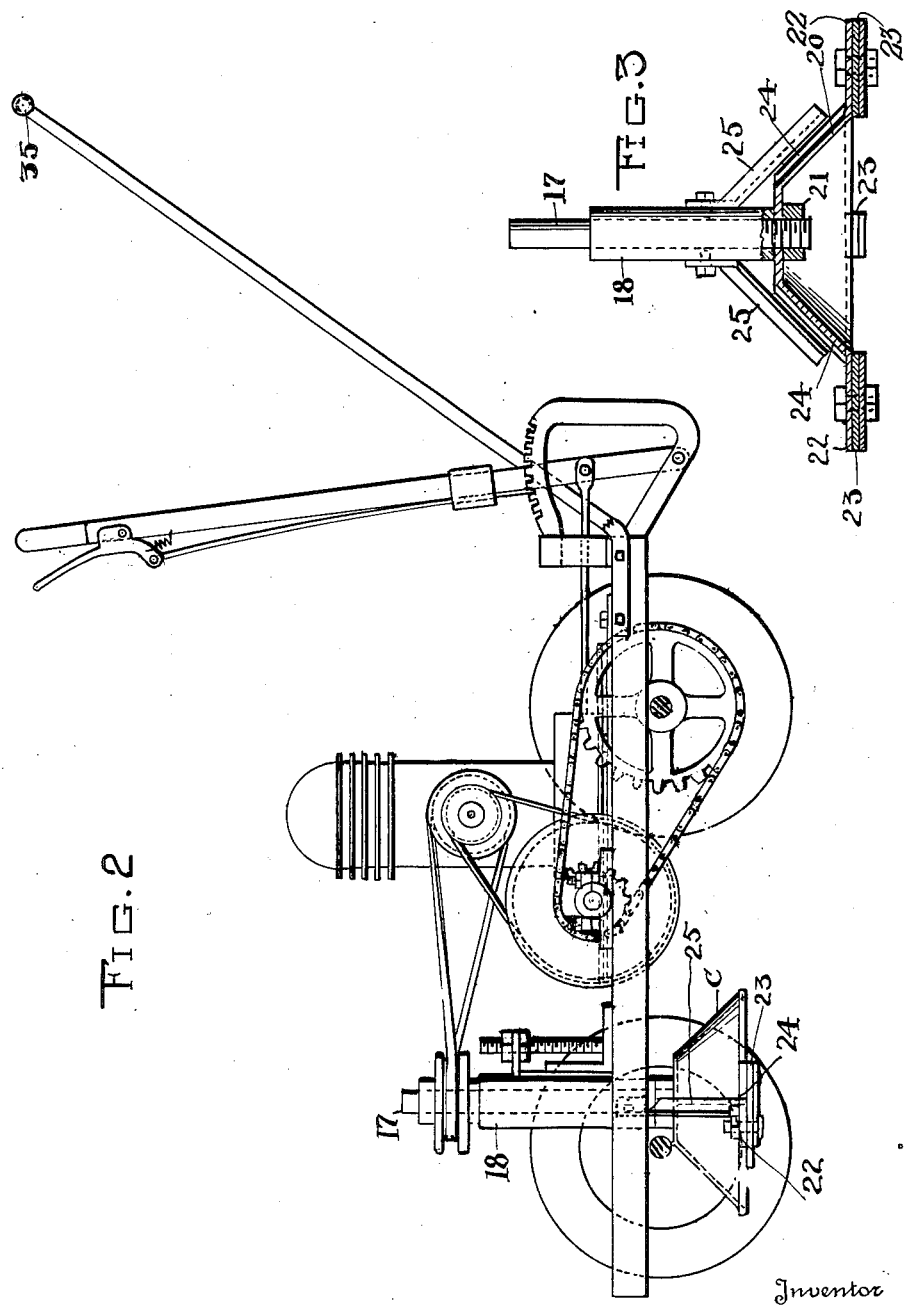

Patented Mar. 5, 1940

2,192,762

UNITED STATES PATENT OFFICE 2,192,762

CUTTING DISK FOR POWER MOWERS

Alexander L. Vincze, St. Petersburg, Fla.

Application June 22, 1938, Serial No. 215,112

1 Claim. (Cl. 56—295)

My invention relates to improvements in a cutting disk for power mowers and an object of my invention is to provide a cutting disk for a mower in which the structure is both practical and economical and the mowing service efficient.

A further object of my invention is the providing of a cutting disk for power mowers whereby through the whirling action of said cutting member a vacuum is created which will raise the grass to mowing position or level thereby assuring even cutting and general mowing efficiency.

No doubt other advantages will present themselves during consideration of the specification, claim and drawings.

I attain these objects by the novel structure described herein and illustrated in the accompanying drawings, wherein:

Fig. 1 is a plan view of my invention in cooperation with a mower.

Fig. 2 is a side elevation, partially in section, of a mower with my invention installed.

Fig. 3 is a side elevation, partially in section, of my invention and directly related parts.

Similar reference characters throughout the several views indicate similar parts.

Now referring more particularly to the drawings which illustrate my preferred form of structure, 20 indicates a cone shaped drum the head of which is flat and solid with a central opening to provide engaging means with a vertical mower blade carrying shaft 17 and secured to said shaft by a nut 21 or any other suitable means. The bottom of said drum is open thereby providing a defined confined air space. Extending outward from the bottom portion of said drum 20 are suitable lateral arms 22 adapted to receive and have secured thereto cutting blades 23 having teeth 23' on the cutting edge thereof.

Forming a part of my cutting disk is a member having a hub 18, adapted for stationary and removeable engagement with the mower by means of a bracket or other suitable means, and free association with said shaft 17, and angular arms 25 suitably spaced thereon and adjustably associated therewith, thereby, providing adjustable contact of angular portions of said arms, which form auxiliary blades, with spaced blade like ribs 24 integrally formed with and upon the outer sloped surface of said drum and extended from the top to the bottom thereof, said contact being to cut and remove accumulations of grass and the like from the outer surface of said drum when same is rotated thereby bringing into contact said ribs 24 with auxiliary blades 25.

During the mowing operation, the whirling action of the drum 25, which defines a confined air space, through the medium of the vertical driving shaft 17 and connected power means, provides a suction which raises the grass to a vertical position thereby drawing the grass into the path of rotation of the cutting blades.

Various changes in form, proportions and minor details of structure are apparent and the right is reserved to make such changes as properly fall within the scope of the appended claim.

What I claim is:

A cutting disk of the character described for a mowing machine having a rotatable vertical cutter drive shaft, comprising a cone shaped drum, the head of which is flat and closed with the exception of a central opening for removeable engagement thereof with said shaft and for rotation therewith, the bottom of said drum being open, and defining a confined air space, spaced integral ribs extended outward from the outer sloped surface and from the head to the bottom thereof, horizontal arms having cutting blades associated therewith extending outward from the bottom portion of said drum and integral therewith and a member associated above and in vertical alignment with said drum and arranged for cooperation therewith, having spaced adjustable auxiliary blades directed to contact said ribs when drum is rotated, for cutting and removal of accumulations upon the outer surface of said drum.

ALEXANDER L. VINCZE.